United States Patent [19]

Tadmor

[11] Patent Number: 4,486,099
[45] Date of Patent: Dec. 4, 1984

[54] ROTARY PROCESSORS AND DEVOLATILIZING METHODS FOR PARTICULATE MATERIALS

[75] Inventor: Zehev Tadmor, Haifa, Israel

[73] Assignee: USM Corporation, Farmington, Conn.

[21] Appl. No.: 532,162

[22] Filed: Sep. 14, 1983

[51] Int. Cl.³ .............................................. B01F 7/10
[52] U.S. Cl. .................................... 366/99; 366/307; 366/315; 425/204; 425/224; 425/466
[58] Field of Search ....................... 366/52, 69, 75–77, 366/80, 90, 91, 97–99, 136, 230, 231, 262–265, 266, 293, 302–307, 312–316, 336, 337, 340, 348; 72/60, 70, 262; 264/85, 349; 425/86, 204, 224, 209, 466, 374, 376; 159/2 E

[56] References Cited

U.S. PATENT DOCUMENTS

| | | |
|---|---|---|
| 3,853,672 | 12/1974 | Gordon et al. |
| 3,928,300 | 12/1975 | Hagberg |
| 3,963,558 | 6/1976 | Skidmore |
| 4,411,532 | 10/1983 | Valsamis et al. ............ 366/99 |
| 4,413,913 | 11/1983 | Hold et al. ................. 366/75 |
| 4,421,412 | 12/1983 | Hold et al. ................. 366/76 |

FOREIGN PATENT DOCUMENTS

| | | |
|---|---|---|
| 2400660 | 7/1974 | Fed. Rep. of Germany |
| 1319083 | 5/1973 | United Kingdom |
| 1379812 | 1/1975 | United Kingdom |

*Primary Examiner*—Timothy F. Simone
*Attorney, Agent, or Firm*—Frances J. P. Craig

[57] ABSTRACT

Novel rotary processors and methods which provide extremely efficient devolatilization of particulate materials which contain substantial amounts of volatiles and in which the boiling point of the volatiles presents separation problems. The processors and methods involve a rotatable element carrying a plurality of annular channels and a stationary element providing a coaxial closure surface operationally arranged with the channels to provide enclosed processing passages. Each passage includes inlet means, outlet means and a channel blocking member all associated with the stationary element and arranged and adapted so that material fed to the inlet can be carried forward by the rotatable channel walls to the blocking member for discharge from the passage. The passages are interconnected by material transfer grooves formed in the closure surface and are arranged to provide at least a melting stage and a devolatilizing stage which operationally communicates with a vacuum source.

In the preferred embodiment, particulate material sprayed with a devolatilization aid or carrier substance is fed to the melting stage through a vacuum hopper, melted, collected and transferred through a strand die mounted at the inlet to the devolatilizing stage. The material in the form of thin strands undergoes unrestricted flash foaming while falling a predetermined distance into the devolatilizing passage, is carried forward, collected, sheared to release the volatiles and is discharged from the devolatilizing stage.

29 Claims, 12 Drawing Figures

ROTARY PROCESSORS AND DEVOLATILIZING METHODS FOR PARTICULATE MATERIALS

BACKGROUND OF THE INVENTION (1) The Field of the Invention

This invention relates to processing apparatus and methods. More precisely, this invention relates to rotary processors particularly useful for processing materials containing dispersed volatiles.

(2) Description of the Prior Art

Rotary processors are known to the art. Details relating to such processors are described in U.S. Pat. Nos. 4,142,805; 4,194,841; 4,207,004; 4,213,709; 4,227,816; 4,255,059; 4,289,319; 4,300,842; 4,329,065; 4,389,119; 4,402,616; 4,411,532; 4,413,913 and 4,421,412.

Essential elements of the basic individual processing passage of rotary processors disclosed in the above patents comprise a rotatable element carrying at least one processing channel and a stationary element providing a coaxial closure surface operationally arranged to form with the channel an enclosed processing passage. The stationary element has an inlet for feeding material to the passage and an outlet for discharge of material from the passage. A member providing a material blocking and material collecting end wall surface is also associated with the stationary element and arranged near the outlet. The end wall surface is adapted to block movement of material fed to the passage and to coact with the moving channel walls to establish relative movement between the blocked material and the moving channel walls. This coaction permits material in contact with the moving walls to be dragged forward to the end wall surface for collection and/or controlled processing and/or discharge.

As disclosed in the above patents, the processing passages present a highly versatile processing capability. The passages are adaptable for performing such processing operations as melting, mixing, pressurizing, pumping, devolatilizing and homogenizing, among others, as well as adding ingredients to or withdrawing ingredients from materials processed in the passage.

U.S. Pat. Nos. 4,227,816; 4,213,709; 4,389,119; 4,402,616 and 4,411,532 relate to multi-stage rotary processors which include a plurality of processing stages, each having one or more processing passages. Material transfer passages or grooves are formed in the closure surface of the stationary element and arranged to transfer material from a passage (or passages) of one stage to a passage (or passages) of another stage.

U.S. Pat. Nos. 4,329,065 and 4,413,913 relate to apparatus and method, respectively, for devolatilizing materials. In accordance with the apparatus and method disclosed therein, material is fed to the processing passage and, near the inlet, the material is collected at a spreading element, builds up pressure and is spread as thin films on the sides of the rotating channel walls. A void space is provided downstream of the spreader and a vacuum source is connected to the void space so that volatile materials can be withdrawn from the surfaces of the thin films carried past the void space. The films may be respread on the channel walls at selected positions about the circumference of the passage to provide more than one void space where the renewed surfaces of the respread films can be exposed to vacuum. The thin films are carried forward through the passage toward the material collecting end wall surface where the films are scraped from the walls, collected and pressurized for discharge. Usually the material is discharged to another devolatilizing passage where it is again spread on the walls and exposed to vacuum in the manner described to achieve the desired degree of devolatilization.

Efficient removal of volatiles from materials is achieved by the method and apparatus disclosed in above-referenced U.S. Pat. Nos. 4,329,065 and 4,413,913. The mass transfer mechanism utilized in the patents primarily involves diffusion of volatiles from the film surfaces during exposure to vacuum or to the inert atmosphere in the void space. In turn, the rate of diffusion of volatiles from the film surfaces—or the volatiles mass transfer efficiency—is dependent on and influenced by such factors as the volatile diffusivity, film thickness, and time of exposure. Thin layers of low viscosity liquid materials provide particularly efficient mass transfer of volatiles from the surfaces of the layers.

U.S. Pat. Nos. 4,389,119; 4,402,616; 4,411,532 and 4,421,412 relate at least in part to apparatus and methods for melting particulate materials. U.S. Pat. No. 4,389,119 discloses a melting stage in which the clearance between the closure surface and the rotor surface portions between melting passages is relatively wide, permitting interchange of material between passages of the stage and providing increased surface area at which melting may take place. A collection channel in the rotor surface is provided outboard of at least one end of the melting stage to control leakage of melted material from the stage. In one embodiment of U.S. Pat. Nos. 4,389,119 and in 4,402,616 and 4,411,532, all of the melting passages discharge material into a common transfer groove for transfer to an adjacent stage. U.S. Pat. No. 4,421,412 discloses an arrangement for a melting passage providing a particulate material restraining surface upstream of the end wall surface and providing control of the space available for the melt pool between the restraining surface and the end wall surface.

This invention is directed to novel improved rotary processors and devolatilizing methods for devolatilization of particulate materials, such as suspension polymerized polystyrene, containing substantial amounts of dispersed volatile component, where the boiling point of the volatiles presents significant problems in separation of volatiles from the material. The processors and methods of this invention provide special advantages in terms of increased devolatilizing efficiency, enhanced quality of product and particularly efficient overall processing performance characteristics.

BRIEF SUMMARY OF THE INVENTION

The novel rotary processors and devolatilizing methods of this invention involve a rotatable element carrying a plurality of annular channels and a stationary element providing a coaxial closure surface operationally arranged with the channels to provide enclosed annular processing passages. Each passage includes an inlet, an outlet and a blocking member which provides an end wall surface for the passage, all associated with the stationary element and arranged and adapted so that material fed to the inlets can be carried forward by the rotatable channel walls to the end wall surfaces where movement of the carried forward material is blocked and the blocked material is collected for discharge from the passage outlets. One or more transfer grooves are formed in the closure surface of the stationary element to interconnect adjacent passages so that material blocked and collected in one or more passage can be transferred to an adjacent passage. One or more upstream passages are arranged to provide a melting stage for the processor. Additionally, a vacuum source is arranged and adapted for operational communication with one or more passages downstream of the melting stage to provide a devolatilizing stage for the processor.

Particulate material sprayed with a devolatilization aid or carrier substance is fed to the melting stage through a vacuum hopper, is melted, collected and transferred to the devolatilizing stage. A strand die mounted in the inlet to the devolatilizing stage obstructs the transferred material so that material is extruded into the devolatilizing passage in the form of thin strands which undergo foaming - and preferably undergo unrestricted foaming while falling gravitationally a predetermined distance before contacting the surfaces of the passage. The material is then carried forward through the passage, collected, sheared to release the volatiles and discharged from the devolatilizing stage.

Details relating to the novel rotary processors and devolatilization methods of this invention as well as the advantages derived from such processors and methods, will be more fully appreciated from the Detailed Description of the Preferred Embodiments taken in connection with the Drawings.

BRIEF DESCRIPTION OF THE DRAWINGS

The invention will be described in connection with the attached drawings in which.

DETAILED DESCRIPTION OF THE PREFERRED EMBODIMENTS

Figure 1:
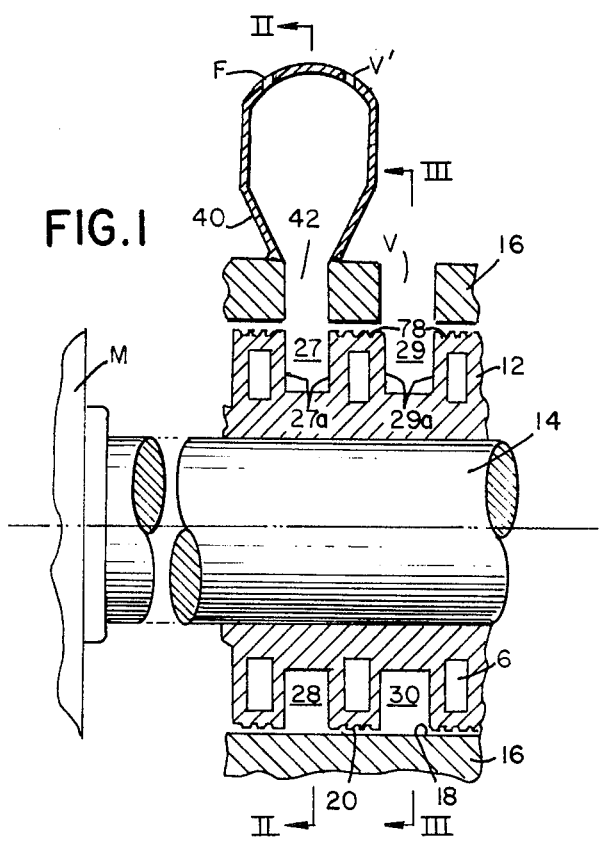
FIG. 1 is a simplified cross-sectional view of a rotary processor of the invention.

Referring first to FIG. 1, the novel rotary processor of this invention includes a rotatable element comprising a rotor 12 mounted on a drive shaft 14 for rotation within a stationary element comprising a housing 16. Rotor 12 carries at least two annular channels 27 and 29, each having opposed side walls 27a and 29a respectively, extending inwardly from rotor surface 20. Means for rotating rotor 12 are designated M, since such means are of any suitable type commonly used for rotating extruders or similar apparatus for processing viscous or plasticated materials and are well known in the art. Housing 16 of the stationary element provides coaxial closure surface 18 cooperatively arranged with surface 20 of rotor 12 to form with channels 27 and 29 enclosed processing passages 28 and 30, the illustrative melting and devolatilizing passages, respectively, of the processor. The vacuum source for maintaining a vacuum within devolatilizing passage 30 is shown as V. Suitable sources include those of the type used for maintaining a vacuum in devolatilizing apparatus such as the devolatilizing sections of screw extruders and in rotary processors such as those described in above-referenced U.S. Pat. Nos. 4,329,065 and 4,413,913. Vacuum sealing means 78 (FIG. 1) are provided between surface 20 of rotor 12 and surface 18 of housing 16 at least at the axial periphery of the devolatilizing passage, to assist in maintaining the vacuum level in the passage. Preferred sealing means 78 are of the type described in commonly owned, co-pending U.S. patent application Ser. Nos. 532,157 and 532,165, filed on the same day as this application by P. S. Mehta, and by P. S. Mehta and L. N. Valsamis respectively, both incorporated herein by reference. Other seals (not shown) may be provided for the processor between surfaces 18 and 20, as needed, and may be of the types disclosed in commonly owned U.S. Pat. Nos. 4,207,004; 4,289,319; and 4,300,842.

As will be explained in more detail below, passages 28 and 30 of the processor are interconnected by transfer groove 50 (FIG. 4) formed in closure surface 18 and arranged so that material processed in melting passage 28 can be transferred to devolatilizing passage 30. The melting and devolatilizing efficiency of the processor may be increased by providing temperature control means to heat at least the side walls of the processing channels, and preferably the housing of the processor as well. Temperature control means 6 illustrated in FIG. 1 is a series of chambers formed in the rotor through which heat transfer fluid may be circulated in a known manner, but any suitable means to control the temperature of the material during processing may be used. The melting and devolatilizing stages illustrated in FIG. 1 each comprise one passage, but more passages may be provided for either or both stages, in which case the passages are preferably interconnected by transfer grooves.

Figure 2:
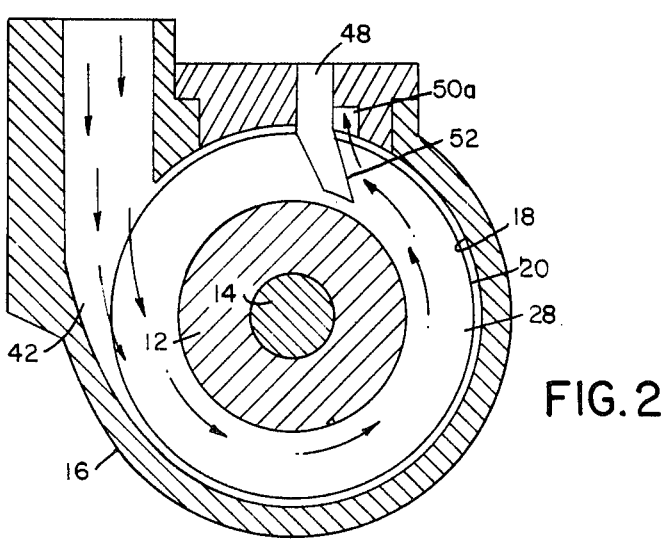
FIG. 2 is a simplified cross-sectional view of a melting passage of the rotary processor of FIG. 1, taken along line II—II of FIG. 1.
Figure 3:
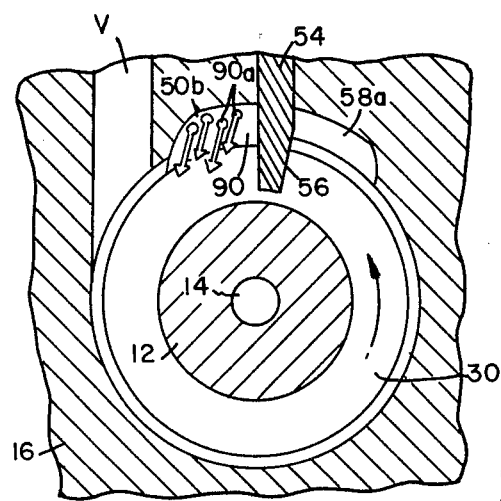
FIG. 3 is a simplified cross-sectional view of a devolatilizing passage of the rotary processor of FIG. 1, taken along line III—III of FIG. 1.

FIGS. 2 and 3 illustrate the melting and devolatilizing passages respectively of the processor of FIG. 1. Melting passage 28 shown in FIG. 2 includes inlet 42 and outlet 50a, both formed in housing 16. Devolatilizing passage 30 (FIG. 3) includes inlet 50b and outlet 58a also formed in housing 16. Outlets 50a and 58a are preferably spaced apart from the inlets a major portion of the circumferential distance about the passages. Each passage (FIGS. 2 and 3) includes an end wall surface (52 and 56 respectively) provided by a blocking member (48 and 54 respectively), each associated with housing 16) and arranged near the passage outlet (50a and 58a respectively) to collect material processed in the passage for discharge from the passage.

Figure 4:
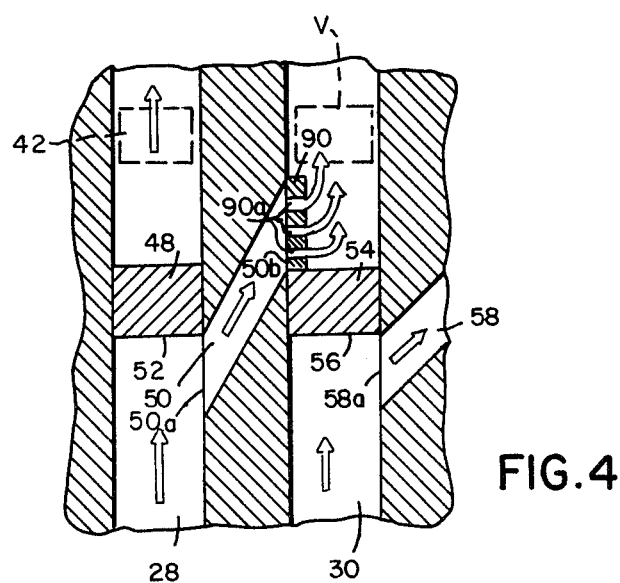
FIG. 4 is a simplified schematic view of the interconnection of the devolatilizing passages of the rotary processor of FIG. 1 by means of a transfer groove, with arrows indicating the direction of flow of material from one passage to another.

FIG. 4 illustrates schematically the movement of material in the processor. As shown in FIG. 4, passages 28 and 30 are interconnected by transfer groove 50 (formed in surface 18 of housing 16) which is arranged so that material melted in passage 28 can be transferred to passage 30 for devolatilizing. Transfer groove 50 provides outlet 50a for passage 28 and inlet 50b for passage 30.

In the preferred embodiment shown in FIGS. 1-4, inlet 42 is adapted for feeding material to melting passage 28 from outside the processor. Also in the preferred embodiment shown in FIGS. 1-4, transfer groove 58 (FIG. 4, formed in surface 18 of housing 16) interconnects passage 30 and a downstream passage or stage (not shown) of the processor, and provides outlet 58a for discharging material from the devolatilizing stage. However, other forms of inlet and/or outlet arrangements for the processor may be used, such as directly discharging material from passage 30 to outside the processor through outlet 58a. Also in the preferred embodiment, material is introduced to melting passage 28 through inlet 42 by means of back-vented hopper 40 (FIG. 1), which communicates with feed means F and with vacuum means V'. Back-vented hopper 40 provides a more consistent feed rate for the material, and may be of the type commonly used for feeding particulate materials to rotary processors, extruders and the like.

The processor illustrated in FIGS. 1-4 includes distinctive features which are especially advantageous in devolitilization of particulate materials containing substantial amounts of dispersed volatile component having a boiling point which to makes devolatilization difficult. For example, the intermediate product of suspension polymerized polystyrene is in the form of small beads of polystyrene containing a substantial amount of unreacted styrene monomer, on the order of 5,000 ppm. Normally, the suspended beads are centrifuged, washed and dried to remove the suspension liquid, and for most uses must be melted, devolatilized and pelletized. Devolatilization to remove the styrene can be difficult to achieve, because of the low partial pressure of the styrene in the material and because of the low diffusivity of the styrene monomer in the polymer matrix. By spraying the beads with a carrier substance or devolatilization aid such as water or pentane, melting the material and incorporating the carrier substance into the material, then devolatilizing it using the rotary processor of this invention, effective separation of volatiles from the polystyrene may be achieved resulting in a superior polymer product for the fabrication of articles of polystyrene.

One particularly distinctive feature of the rotary processor of this invention, illustrated in FIGS. 3 and 4, is strand die 90, inserted into inlet 50b of devolatilizing passage 30. Strand die 90 provides an obstruction to the flow of material into devolatilizing passage 30, inducing pressure upstream of die 90, which then forces the material through die orifices 90a. The material then enters passage 30 in the form of thin strands of extruded material. Inlet 50b, strand die 90 and vacuum means V preferably are arranged in passage 30 so that the strands of material entering the passage will fall gravitationally (as shown in FIG. 3) a predetermined distance (as falling strands) before contacting the rotating channel walls or other material, undergoing flash foaming as they are exposed to the vacuum in the passage provided by vacuum means V. The pressure upstream of strand die 90 also provides for complete filling of transfer groove 50, preventing vacuum leakage through transfer groove 50. Means (not shown) are also provided to control vacuum leakage through transfer groove 58. Such means may be of the type described in above-referenced application Ser. Nos. 532,157 and 532,165.

In operation, particulate material such as suspension polymerized polystyrene is sprayed with a carrier substance or devolatilization aid such as water or pentane, and is introduced to melting passage 28 through back-vented hopper 40 and inlet 42 (FIG. 1). The wet particulate material is dragged by rotating channel side walls 27a (FIG. 1) toward end wall surface 52 (FIG. 2) of passage 28. At end wall surface 52, movement of the main body of material is blocked and relative movement is established between rotating channel walls 27a and the blocked material. The so-established relative movement generates frictional heat at the rotating channel walls and within the body of material. Additionally, heating of the material may be aided by heating channel walls 27a of the melting passage by means of temperature control means 6 (FIG. 1). The frictional heat and the heat transferred through channel walls 27a of melting passage 28 result in substantially complete melting of the material in melting passage 28. The melting mechanism taking place in melting passage 28 is described in more detail in commonly owned U.S. Pat. Nos. 4,142,805 and 4,194,841, incorporated herein by reference. The melted material is then collected at end wall 52. The carrier substance is effectively incorporated into the material during the melting and collecting processes to increase the separation efficiency within the devolatilizing stage. The melted material collected at end wall 52 builds up pressure for discharge through outlet 50a and through transfer groove 50 to devolatilizing passage 30, as shown in FIG. 4.

The material entering devolatilizing passage 30 at inlet 50b (FIGS. 3 and 4) is obstructed by strand die 90 positioned at inlet 50b, building up pressure upstream of strand die 90 within transfer groove 50 and within the recirculating pool of material at end wall surface 52. The resulting pressure build-up behind strand die 90 is sufficient to extrude the melted material through strand die orifices 90a, so that the extruded material enters devolatilizing passage 30 in the form of narrow strands of material. These strands of material immediately undergo evaporation and flash foaming as they are exposed to the vacuum in devolatilizing passage 30 provided by vacuum means V (FIGS. 1 and 3). This flash foaming mechanism is enhanced by the incorporation of the carrier substance into the material. As shown in FIG. 3, inlet 50b, strand die 90 and vacuum means V may be arranged in passage 30 so that the strands of material entering passage 30 through strand die 90 will fall gravitationally a predetermined distance before contacting the rotating channel walls or other material, as described above. This provides a period of time in which enhanced spontaneous evaporation of the volatiles may take place, forming bubbles of volatiles within the strands of material. This enhanced separation of volatiles from the material is due to the increased surface area provided by the extrusion of the material into strands and by the lack of pressurization or shearing within the strands of material during its free fall before contacting the rotating channel side walls of devolatilizing passage 30. During this time of free gravitational fall, some of the bubbles in the strands of material may rupture spontaneously. The volatiles released by this bubble rupture are removed from passage 30 by a vacuum means V.

The foamed strands of material are then carried by the rotating channel walls of devolatilizing passage 30 toward end wall surface 56 (FIGS. 3 and 4) for collection as a rapidly recirculating pool of material. The rapid recirculation of the foamed material at end wall surface 56 provides shearing of the material for surface renewal and rupture of the bubbles of volatiles within the material. The temperature within devolatilizing passage 30 may be controlled by temperature control means 6 in a manner similar to that described for melting passage 28, and may be maintained at the same or different temperature as passage 28. The devolatilized material is then discharged from passage 30 through outlet 58a (FIGS. 3 and 4).

Figure 5:
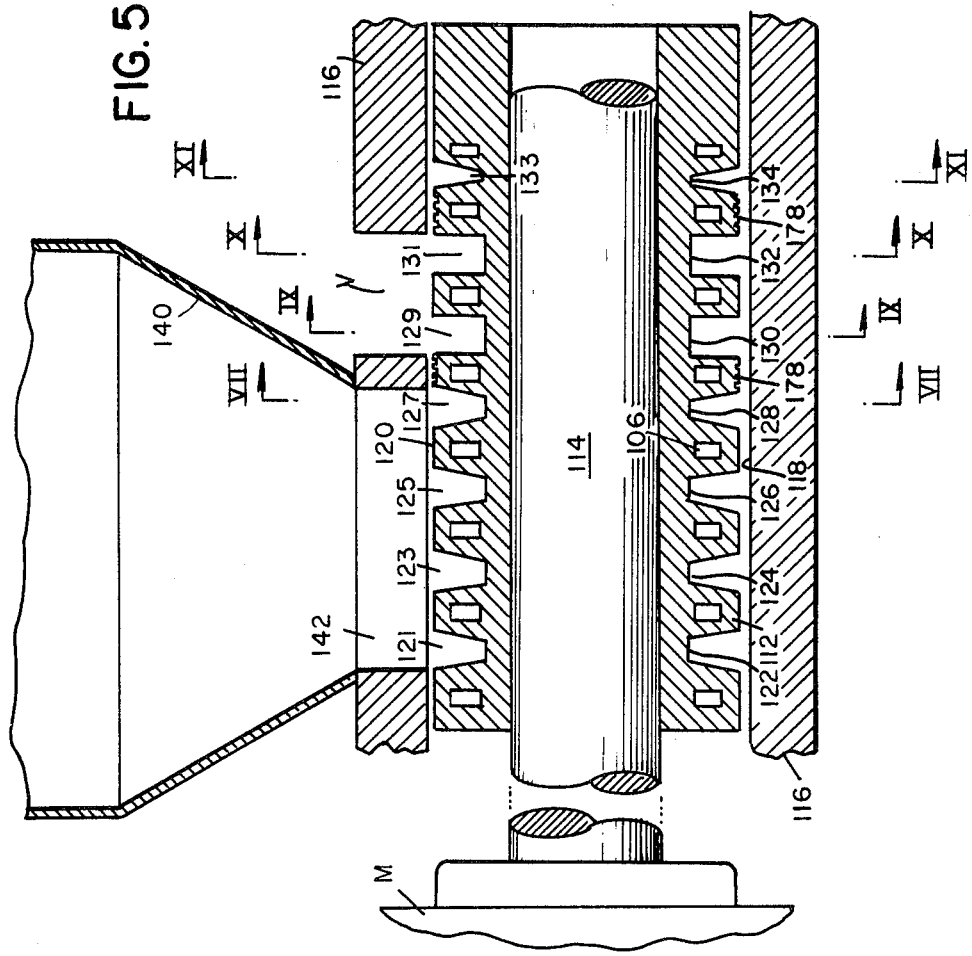
FIG. 5 is a simplified cross-sectional view of a multistage rotary processor of the invention showing an arrangement of processing passages providing a melting stage, a devolatilizing stage and a pumping stage.
Figure 6:
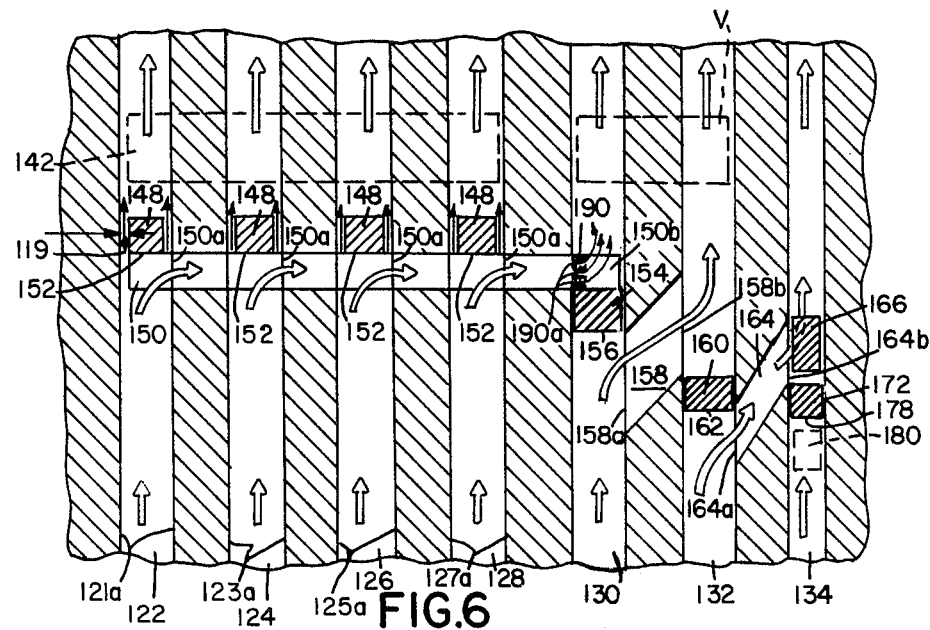
FIG. 6 is a simplified schematic view of the interconnection of the passages of FIG. 5 by means of transfer grooves, with arrows indicating the direction of flow of material from one passage to another.

FIGS. 5–11 illustrate an especially preferred multistage rotary processor including the novel features of this invention. As shown in FIG. 5, rotor 112 mounted on drive shaft 114 and rotated by rotating means M carries a plurality of annular channels enclosed by closure surface 118 of housing 116 to form processing passages. These processing passages are arranged to provide several processing stages within the processor for performing various processing functions. Processing passages 122, 124, 126 and 128, formed with channels 121, 123, 125 and 127 respectively, provide a melting stage for the processor which is arranged to receive particulate material fed to the processor through inlet 142, which is a common inlet shared by all of the passages of the melting stage. Inlet 142 communicates with hopper 140, which is preferably a back-vented hopper similar to that described above for hopper 40 (FIG. 1). Melting channels 121, 123, 125 and 127 each have side walls 121a, 123a, 125a and 127a respectively, as shown in FIG. 6.

First devolitalizing passage 130 and last devolatilizing passage 132, formed with channels 129 and 131 respectively (FIG. 5), provide a devolatilizing stage for the processor which communicates with vacuum means V to devolatilize material received from the melting stage. Pumping passage 134, formed with channel 133, provides a pumping stage to pressurize and discharge material received from the devolatilizing stage from the processor.

Vacuum sealing means 178 are provided between surface 118 of housing 116 and surface 120 of rotor 112 at least at the axial periphery of the devolatilizing stage in a manner similar to that described above for seals 78 (FIG. 1). Other seals (not shown) may be provided as needed, as described above for the processor of FIGS. 1–4. Any or all of the passages of the processor may be heated by temperature control means 106 (FIG. 5) in a manner similar to that described for temperature control means 6 (FIG. 1).

Figure 7:
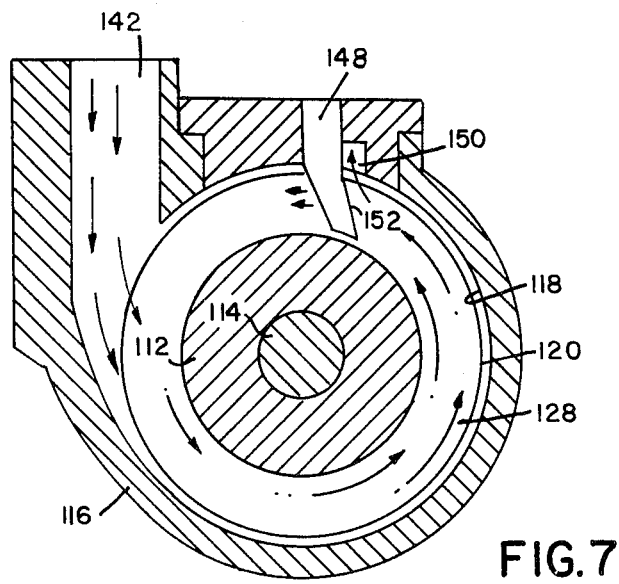
FIG. 7 is a simplified cross-sectional view of a melting passage of FIG. 5, taken along line VII—VII of FIG. 5 with broken arrows indicating the flow of some of the material past the channel blocking member.
Figure 8:
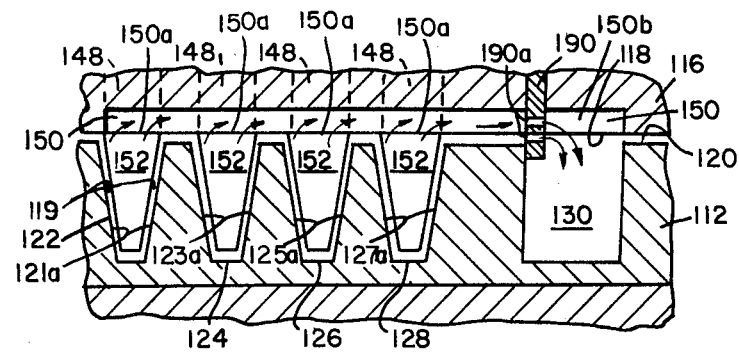
FIG. 8 is a simplified cross-sectional view of the processor of FIG. 5, showing in more detail the strand die and the transfer groove interconnecting the melting and devolatilizing stages with arrows indicating the direction of flow of material from one stage to the other.

As illustrated schematically in FIG. 6, the passages are interconnected by material transfer grooves (formed in surface 118 of housing 116) arranged so that material processed in one or more passages can be transferred to another passage or passages for further processing. The transfer grooves and the inlets and outlets associated therewith may be formed directly in the closure surface. Alternatively, they, as well as the blocking members described below, may be provided by one or more removable transfer plates associated with housing 116, as described in commonly owned U.S. Pat. No. 4,227,816. Each passage of the melting stage, has a blocking member 148 which provides end wall surface 152 to block the forward movement of material in the passage and collect the material for discharge through outlet 150a. FIG. 7 illustrates in more detail passage 128, a representative passage of the melting stage, showing the preferred circumferential relationship of inlet 142, outlet 150a and end wall surface 152. An especially preferred melting stage arrangement for the processor is described in detail in commonly owned U.S. Pat. No. 4,421,412 incorporated herein by reference. Outlets 150a for melting passages 122, 124, 126 and 128 are provided by transfer groove 150, illustrated in FIGS. 6 and 8, which also provides inlet 150b for devolatilizing passage 130. As shown in FIGS. 6 and 8, transfer groove 150 extends over all of the passages of the melting stage to receive melted material collected at end walls 152 and to transfer the melted material to the devolatilizing stage.

In operation, particulate material sprayed with a carrier substance, as described above, is supplied to the melting stage through common inlet 142 from hopper 140 (FIG. 5). The particulate material is received into melting passages 122, 124, 126 and 128 and is dragged forward by rotating channel side walls 121a, 123a, 125a and 127a (FIGS. 6, 7 and 8) toward end walls 152 of the melting passages. At end walls 152, movement of the main body of particulate material is blocked and relative movement is established between the rotating channel walls and the blocked material. The so-established relative movement generates frictional heat at the moving walls and within the body of material to melt the material. Additionally, heat is transferred to the material through the melting channel side walls, which are heated by temperature control means 106 (FIG. 5).

As more material is carried toward end walls 152 (FIGS. 6 and 7) of melting passages 122, 124, 126 and 128, the melted material is collected at end walls 152 and mixing of the carrier substance with melted material occurs. Normally, the action of the channel walls in dragging material forward builds up pressure progressively about the melting passages and at end walls 152 of blocking members 148. This pressure buildup at end walls 152 aids in discharging the melted material from outlets 150a of the melting passages to common transfer groove 150 for transfer from the melting stage to first devolatilizing passage 130 of the devolatilizing stage (FIGS. 6 and 8).

The efficiency of the melting stage may be enhanced by increasing clearance 119 (FIGS. 6 and 8) between blocking members 148 and side walls 121a, 123a, 125a and 127a of the melting passages sufficiently to permit some of the melted material collected at end walls 152 to be dragged past blocking members 148 (FIGS. 6 and 7) by the rotating side walls. The material is then recycled to the vicinity of inlet 142 to mix with the particulate material entering the melting stage. The advantages of this recycling are described in detail in above-referenced U.S. Pat. No. 4,421,412.

Figures 9, 10:
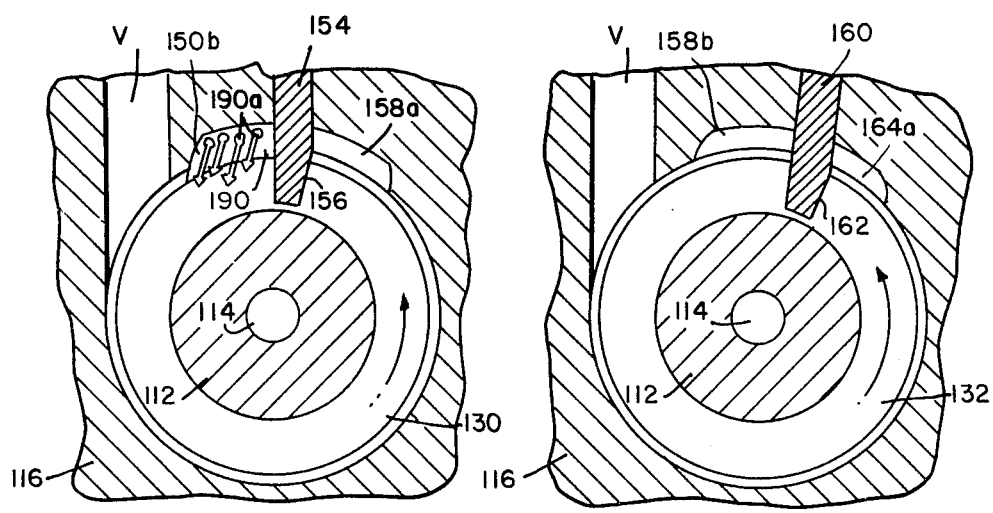
FIG. 9 is a simplified cross-sectional view of a first devolatilizing passage of FIG. 5, taken along line IX—IX of FIG. 5 with larger arrows indicating the flow of the material entering the passage through the strand die.
FIG. 10 is a simplified cross-sectional view of a last devolatilizing passage of FIG. 5, taken along line X—X of FIG. 5.

First devolatilizing passage 130, illustrated in FIGS. 5, 6, 8 and 9, has strand die 190 (FIGS. 6, 8 and 9) disposed in inlet 150b to obstruct the passage of melted material from transfer groove 150 to first devolatilizing passage 130. Operational communication between transfer groove 150 and passage 130 is provided by die orifices 190a in strand die 190, through which the melted material enters passage 130 in the form of thin strands. As shown in FIG. 9, inlet 150b, strand die 190, and vacuum means V may be arranged about passage 130 so that the falling strands of material entering passage 130 will fall gravitationally for a predetermined distance before contacting the rotating walls of devolatilizing channel 130 or other material. Passage 130 has blocking member 154, providing end wall surface 156 (FIGS. 6 and 9) to block and collect material devolatilized in the passage for discharge through outlet 158 to transfer groove 158. Transfer groove 158 (FIG. 6) interconnects devolatilizing passages 130 and 132 and provides outlet 158a of passage 130 and inlet 158b of passage 132.

Last devolatilizing passage 132 illustrated in FIGS. 5, 6 and 10, is arranged to further devolatilize material received from passage 130, and has blocking member 160 providing end wall 162 to block and collect material for discharge from the devolatilizing stage through outlet 164a. Transfer groove 164 (FIG. 6) interconnects last devolatilizing passage 132 and pumping passage 134, and provides outlet 164a of passage 132 and inlet 164b of passage 134. Vacuum means V (FIGS. 5, 6 9 and 10) preferably communicates with both devolatilizing passages 130 and 132 to maintain a vacuum in the devolatilizing stage and to remove released volatiles from the stage.

The devolatilizing stage provided by first devolatilizing passage 130, last devolatilizing passage 132 and transfer groove 158 interconnecting passages 130 and 132 preferably provides a spatial geometrical arrangement yielding integrated control of the processing volume capacities of devolatilizing passages 130 and 132 and of the transfer volume capacity of transfer groove 158, as described in detail in commonly owned, copending U.S. patent application Ser. No. 532,166, filed on the same day as this application by P. S. Mehta, L. N. Valsamis and Z. Tadmor and incorporated herein by reference. The integrated control of these features and capacities provides a devolatilizing stage arrangement which may be coordinated with the volumetric processing rate and the vacuum level, and with the characteristics of the material being processed to provide effective separation of volatiles from material processed in the devolatilizing stage by fully exploiting the foam devolatilization mechanism described in application Ser. No. 532,166.

In operation, the melted material entering first devolatilizing passage 130 through orifices 190a of strand die 190 immediately undergo evaporation and flash foaming as they are exposed to the vacuum in passage 130 provided by vacuum means V (FIGS. 6 and 9). The strands of material undergoing flash foaming fall gravitationally for a predetermined distance, contact the rotating walls of first devolatilizing passage 130 and are carried toward end wall 156 of passage 130 for collection as a rapidly recirculating pool of material for shearing to release the bubbles of volatiles from the material. The material is then discharged through outlet 158a (FIGS. 6 and 9) and transferred through transfer groove 158 (FIG. 6) to last devolatilizing passage 132 (FIGS. 5, 6 and 10) for further devolatilizing. Material is received into last devolatilizing passage 132 through inlet 158b, is further devolatilized and is collected as a rapidly recirculating pool at end wall 162 of passage 132. At end wall 162, the material is collected, sheared and pressurized for discharge through outlet 164a and transfer through transfer groove 164 to pumping passage 134.

Figure 11:
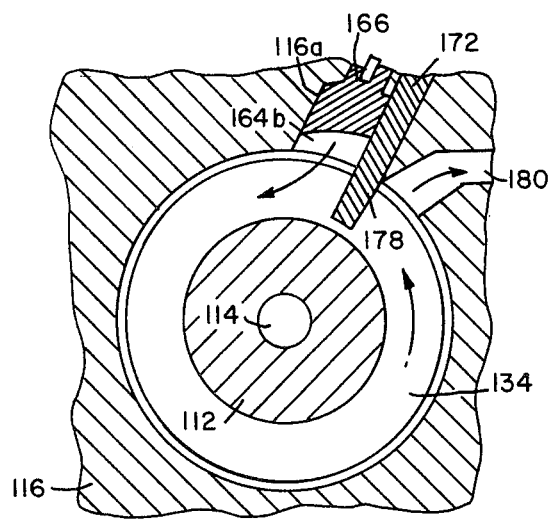
FIG. 11 is a simplified cross-sectional view of a pumping passage of FIG. 5, taken along line XI—XI of FIG. 5.

Pumping passage 134, illustrated in FIGS. 5, 6 and 11, provides control gate 166 at inlet 164b to the passage for control of the outlet pressure from the devolatilizing stage. Control gate 166 obstructs the passage of material into passage 134 providing complete filling of transfer groove 164 to prevent vacuum leakage through transfer groove 164, as described in above-referenced application Ser. Nos. 532,157; 532,165 and 532,166. Pumping passage 134 is adapted to receive devolatilized material from the devolatilizing stage and to further pressurize the material for collection at end wall surface 178 of blocking member 172 and discharge of the material from the processor through outlet 180. A discharge control means such as an outlet valve (not shown) may be used to control the pressurization of material in pumping passage 134 and the discharge of the material from the processor. Alternatively, an extrusion die such as a pelletizing die (not shown) may be inserted in outlet 180 to control the pressurization of material in pumping passage 134 and to permit extrusion of devolatilized material directly from the processor.

In operation, devolatilized material entering pumping passage 134 is carried forward by the rotating channel walls toward end wall surface 178 where the movement of the material is blocked, building up pressure within the material progressively about pumping passage 134. Maximum pressure in passage 134 is normally reached at end wall surface 178 of the passage. Pressurized material at end wall surface 178 passes through outlet 180 from which it may be extruded as pelletized material or collected for further processing.

Figure 12:
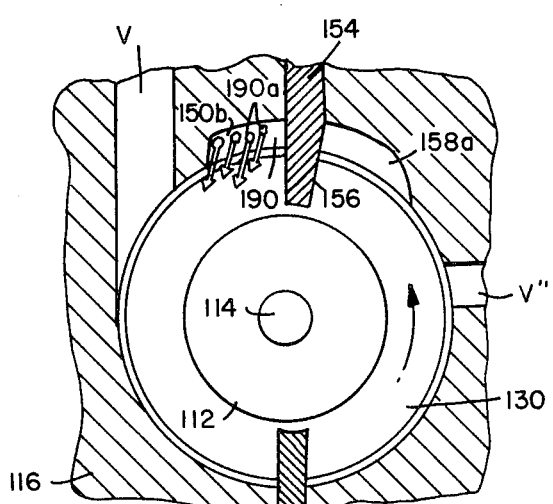
FIG. 12 is a simplified cross-sectional view of a first devolatilizing passage, illustrating an alternate arrangement of the passage.

FIG. 12 illustrates an alternate arrangement for the devolatilizing stage of the processor of FIG. 5, showing spreader member 192 disposed between vacuum means V and outlet 158a and extending into passage 130 to block the movement of material in the passage and to spread the liquid material on the rotating channel walls of the passage, in a manner similar to that described in above-referenced U.S. Pat. No. 4,329,065, creating a void space downstream of spreader member 192 between the thin layers of material spread on the channel walls. Vacuum means V''' communicates with the void space downstream of spreader member 192 to withdraw volatiles from the surfaces of the thin films carried by the rotating channel walls. Blocking member 154 provides end wall surface 156 for first devolatilizing passage 130 to collect the devolatilized material for shearing for bubble rupture and release of the volatiles, and for discharge from passage 130 through outlet 158a. A similar arrangement of spreader member 192 and vacuum means V''' may be provided for last devolatilizing passage 132, if desired.

As may be seen from the embodiments described above, the invention presents to the art novel rotary processors having unexpectedly improved devolatilizing effects and overall processing performance characteristics as compared to processors known to the art at the time this invention was made.

I claim:

1. A method of processing particulate material containing volatiles dispersed therein comprising the steps of:
   (a) spraying the particulate material with a carrier substance;
   (b) introducing the material at a feed point to a processing zone including
      (i) one or more substantially annular melting zones each defined by two rotatable, substantially circular walls, a coaxial, stationary surface enclosing the melting zone, and a stationary end wall, each melting zone having an inlet point, the inlet point(s) of the melting zone(s) providing the feed point of the processing zone, and an outlet point near the end wall and spaced apart from the inlet point;
      (ii) at least a first substantially annular devolatilizing zone defined by two rotatable, substantially circular walls, a coaxial stationary surface enclosing the first devolatilizing zone, and a stationary end wall, and having an inlet point and an outlet point near the end wall and spaced apart from the inlet point; and
      (iii) a transfer zone interconnecting the melting zone(s) and the first devolatilizing zone, and defined by a stationary groove and a closure surface, and wherein the upstream end of the groove is open to each melting zone to provide its outlet point and the downstream end of the groove is open to the first devolatilizing zone to provide its inlet point, and having a strand die positioned at the inlet point of the first devolatilizing zone so that the transfer zone and the first devolatilizing zone are interconnected by orifices through the strand die;
   (c) rotating the walls of the melting zone(s) at substantially equal velocities, in the same direction from the inlet(s) toward the end wall(s), thereby dragging the material forward through each melting zone;
   (d) collecting the material at the melting zone end wall(s) so that relative motion is established between the collected material and the material dragged toward the melting zone end wall(s) by the rotating walls of the melting zone(s) so that the temperature and pressure within the material increases sufficiently to substantially completely melt the material as it approaches the melting zone end wall(s);
   (e) discharging the melted, pressurized material from the melting zone(s) at the outlet point(s) to the transfer zone;
   (f) transferring the melted, pressurized material downstream through the transfer zone to the inlet point of the first devolatilizing zone;
   (g) extruding the melted, pressurized material into the first devolatilizing zone as narrow strands of material;
   (h) maintaining a vacuum in the first devolatilizing zone capable of inducing the formation of bubbles containing volatiles in the material;
   (i) rotating the walls of the first devolatilizing zone at substantially equal velocities, in the same direction from the inlet point toward the first devolatilizing zone end wall, so that the material is carried forward through the first devolatilizing zone;
   (j) collecting the material as a rapidly recirculating pool at the end wall of the first devolatilizing zone so that shear is induced within the material for bubble rupture and release of the volatiles;
   (k) removing the released volatiles from the first devolatilizing zone;
   (l) discharging the devolatilized material from the outlet point of the first devolatilizing zone to the next adjacent downstream zone or to a discharge point for the processing zone; and
   (m) discharging the devolatilized material from the discharge point of the processing zone.

2. A method according to claim 1 wherein the processing zone further includes one or more additional substantially annular devolatilizing zones adapted to receive material from and interconnected for in-series operation with the first devolatilizing zone, each defined by two rotatable, substantially circular walls, a coaxial, stationary surface enclosing the additional devolatilizing zone, and a stationary end wall, and each having an inlet point and an outlet point near the end wall and spaced apart from the inlet point; and further comprising the steps of:
   (a) maintaining a vacuum in the additional devolatilizing zone(s) capable of inducing the formation of bubbles containing volatiles in the material;
   (b) rotating the walls of the additional devolatilizing zone(s) at substantially equal velocities, in the same direction from the inlet point toward the additional devolatilizing zone end wall(s), so that the foamed material received from the first devolatilizing zone is carried forward through each additional devolatilizing zone(s) in series;
   (c) collecting the material as a rapidly recirculating pool(s) at the end wall(s) of the additional devolatilizing zone(s) so that shear is induced within the material for bubble rupture and release of the volatiles;
   (d) removing the released volatiles from the additional devolatilizing zone(s); and
   (e) discharging the devolatilized material from the outlet point of each additional devolatilizing zone to the next adjacent downstream zone or to the discharge point of the processing zone.

3. A method according to claim 1 or claim 2 wherein the processing zone further includes at least one substantially annular pumping zone defined by two rotatable, substantially circular walls, a coaxial, stationary surface enclosing the pumping zone, and a stationary end wall, and having an inlet point and an outlet point near the end wall and spaced apart from the inlet point, the inlet point of the pumping zone adapted to receive material from the most downstream devolatilizing zone and the outlet point of the pumping zone providing the discharge point for the processor; and further comprising the step of:
   (a) rotating the walls of the pumping zone at substantially equal velocities, in the same direction from the inlet toward the pumping zone end wall, so that the material is dragged forward through the pumping zone; and
   (b) collecting the material at the pumping zone end wall so that relative motion is established between the collected material and the material dragged toward the pumping zone end wall by the rotating walls of the pumping zone and so that the pressure within the material increases as it approaches the pumping zone end wall.

4. A method according to claim 1 wherein the material is introduced to the processing zone through a vacuum hopper communicating with the feed point of the processing zone.

5. A method according to claim 1 further comprising the step of recycling some of the melted material collected at the melting zone end wall(s) to the feed point of the processing zone so that the recycled material is mixed with the particulate material in the melting zone(s) to increase the melting rate of material in the melting zone(s).

6. A method according to claim 1 further comprising the step of heating at least the side walls of the melting zone(s) to increase the melting rate in the melting zone(s).

7. A method according to claim 1 or claim 2 further comprising the step of heating at least the side walls of the devolatilizing zone(s) to increase the rate of separation of volatiles from the material.

8. A method according to claim 2 wherein:
   (a) the additional devolatilizing zone(s) and the first devolatilizing zone are interconnected for in-series operation by an additional transfer zone(s) defined by a stationary groove and a closure surface and wherein the up-stream end of each groove is open to a devolatilizing zone to provide its outlet point and the downstream end of each groove is open to the next downstream devolatilizing zone to provide its inlet point; and wherein
   (b) the step(s) of discharging the material from the outlet point(s) of the first devolatilizing zone and of each additional devolatilizing zone except the most downstream additional devolatilizing zone includes transferring the material to the next adjacent downstream devolatilizing zone through an additional transfer zone; and wherein
   (c) at least one additional transfer zone has a strand die positioned at the inlet point of an additional devolatilizing zone so that the additional transfer zone(s) and the additional devolatilizing zone(s) are interconnected by the openings through the strand die(s); and further comprising the step of
   (d) extruding the material into the at least one additional transfer zone through the additional strand die(s).

9. A method according to claim 1 or claim 8 further comprising the step of allowing the strands of material from the strand die(s) entering the associated devolatilizing zone(s) to fall gravitationally a predetermined distance into the devolatilizing zone(s) for unrestrained foaming of the strands of material.

10. A method according to claim 1 wherein the particulate material is suspension polymerized polystyrene and the volatiles contained therein include unreacted styrene monomer 11. A method according to claim 10 wherein the styrene monomer is present in a proportion on the order of 5,000 ppm.

12. A method according to claim 1 or claim 10 wherein the carrier substance is water.

13. A method according to claim 1 or claim 10 wherein the carrier substance is pentane.

14. A rotary processor for processing particulate materials having volatiles contained therein and comprising:
   (a) a rotatable element comprising a rotor carrying at least first and second annular processing channels, each channel having opposed side walls extending radially inwardly from the rotor surface;
   (b) a stationary element having a coaxial closure surface cooperatively arranged with the channels to provide at least first and second enclosed processing passages, each processing passage having an inlet, a blocking member providing an end wall for the passage and spaced apart from the inlet, and an outlet near the end wall, all associated with the stationary element and arranged so that material fed to the inlet is dragged forward by the rotating channel walls, is collected at the end wall and is discharged through the outlet; and
   (c) a material transfer groove formed in the closure surface, interconnecting the first and second passages for in-series operation and extending from a point near the first passage end wall to the second passage and providing the outlet for the first passage and the inlet for the second passage so that melted material may be discharged from the first passage and transferred to the second passage; and wherein
   (d) the first passage is arranged to provide a melting passage to generate an increase in the temperature within the material collected at the first passage end wall sufficient to substantially completely melt the material in the melting passage; and wherein
   (e) the second passage communicates with vacuum means and cooperates with sealing means to provide a first devolatilizing passage in which a low pressure level is maintained capable of inducing the formation in the material of bubbles containing volatiles, and from which volatiles released from the material are removed by the vacuum means; and further comprising:
   (f) a strand die positioned at the inlet to the first devolatilizing passage and arranged so that material transferred to the first devolatilizing passage passes through the strand die, entering the first devolatilizing passage as strands of melted material so that flash foaming may occur as bubbles of volatiles form in the strands of material, and wherein the devolatilizing passage is arranged so that the foamed material contacts the rotating walls of the passage, is carried forward through the passage, is collected at the first devolatilizing passage end wall for shearing and bubble rupture for release of the volatiles, and is discharged to a further passage of the processor or to a point outside the processor.

15. Apparatus according to claim 14 further comprising one or more additional annular processing channels carried by the rotor, having opposed side walls extending radially inwardly from the rotor surface and enclosed by the closure surface to form one or more additional melting passages upstream of the first melting passage, each additional melting passage having an inlet, a blocking member providing a passage end wall spaced apart from the inlet, and an outlet near the end wall all associated with the stationary element; and wherein each additional melting passage is arranged so that material fed to the inlet is carried forward by the rotating channel walls, is collected at the end wall where an increase in temperature is generated sufficient to substantially completely melt the material in the passage, and is discharged through the outlet; and wherein the transfer groove also provides the outlet for each additional melting passage; and wherein each additional melting passage is arranged to operate in parallel with the first melting passage and to discharge melted material to the transfer groove.

16. Apparatus according to claim 14 further comprising one or more additional annular processing channels carried by the rotor, having opposed side walls extending radially inwardly from the rotor surface and enclosed by the closure surface to form one or more additional devolatilizing passages downstream of the first devolatilizing passage, each additional devolatilizing passage having an inlet, a blocking member providing a passage end wall spaced apart from the inlet, and an outlet near the end wall all associated with the stationary element; and wherein the vacuum means or one or more additional vacuum means are operationally arranged to remove volatiles from each additional devolatilizing passage and are capable of inducing separation of the volatiles from the material in each additional devolatilizing passage; and wherein the one or more additional devolatilizing passages are arranged for in-series operation with the first devolatilizing passage, so that material discharged from the first devolatilizing passage is received into each additional devolatilizing passage in series for exposure to vacuum, separation of the volatiles from the material, collection and shearing at the end wall for release of the volatiles, and discharge to the next adjacent devolatilizing passage, to a further passage of the processor or to a point outside the processor.

17. Apparatus according to claim 14 or claim 15 further comprising a vacuum hopper through which material is fed to the inlet(s) of the melting passage(s) through a single opening through the stationary element.

18. Apparatus according to claim 14 or claim 15 wherein at least one melting passage is arranged to permit recycling of some of the melted material collected at the end wall to the inlet so that the recycled material is mixed with the particulate material entering the passage, to increase the melting rate of the processor.

19. Apparatus according to claim 14 or claim 15 wherein at least the walls of the melting passage(s) are heated to increase the melting rate of the material.

20. Apparatus according to claim 14 or claim 16 wherein at least the walls of the devolatilizing passage(s) are heated to increase the rate of separation of volatiles from the material.

21. Apparatus according to claim 16 wherein the devolatilizing passages are interconnected for in-series operation by additional material transfer grooves formed in the closure surface, each additional transfer groove extending from a point near the end wall of one devolatilizing passage to the next adjacent downstream passage, and providing the outlet for the one passage and the inlet for the next adjacent downstream passage so that material may be transferred from the one passage to the next adjacent downstream passage, moving in series from the first devolatilizing passage to the most downstream devolatilizing passage; and further comprising a strand die positioned at the inlet of at least one additional devolatilizing passage and arranged so that material transferred to the at least one additional devolatilizing passage passes through the strand die, entering the passage as strands of material, so that flash foaming may occur as bubbles of volatiles foam in the strands of material before the material contacts the walls of the passage and is carried forward toward the end wall for shearing and bubble rupture for release of the volatiles.

22. Apparatus according to claim 14 or claim 21 wherein the vacuum means, the inlet to the devolatilizing passage(s) and the strand die(s) are arranged to permit the strands of material entering the passage(s) to fall gravitationally a predetermined distance before contacting the walls of the passage(s) so that unrestrained flash foaming may occur as bubbles of volatiles form in the strands of material.

23. Apparatus according to claim 14, claim 15 or claim 16 further comprising at least one pumping channel carried by the rotor, having opposed side walls extending radially inwardly from the rotor surface and enclosed by the closure surface to form at least one pumping passage downstream of the devolatilizing passage(s) and having an inlet, a blocking member providing a passage end wall spaced apart from the inlet, and an outlet near the end wall all associated with the stationary element and arranged so that material entering the pumping passage is dragged forward by the rotating channel walls, is collected at the end wall and is discharged through the outlet to a point outside the processor; and wherein the pumping passage is arranged to generate discharge pressure within the material collected at the pumping passage end wall.

24. Apparatus according to claim 14, further including means to control discharge of material from the processor.

25. Apparatus according to claim 14 wherein the particulate material processed is suspension polymerized polystyrene and the volatiles contained therein include unreacted styrene monomer.

26. Apparatus according to claim 25 wherein the styrene monomer is present in a proportion on the order of 5,000 ppm.

27. Apparatus according to claim 14 or claim 25 or claim 26 wherein the particulate material to be processed has been sprayed with a carrier substance to facilitate separation of volatiles from the material.

28. Apparatus according to claim 27 wherein the carrier substance is water.

29. Apparatus according to claim 27 wherein the carrier substance is pentane.

* * * * *